(12) United States Patent
Matsushima

(10) Patent No.: US 12,490,417 B2
(45) Date of Patent: Dec. 2, 2025

(54) GROUND STRUCTURE-EQUIPPED LAMINATED GLASS FOR VEHICLES

(71) Applicant: AGC Inc., Tokyo (JP)

(72) Inventor: Takanori Matsushima, Tokyo (JP)

(73) Assignee: AGC INC., Tokyo (JP)

( * ) Notice: Subject to any disclaimer, the term of this patent is extended or adjusted under 35 U.S.C. 154(b) by 170 days.

(21) Appl. No.: 18/372,481

(22) Filed: Sep. 25, 2023

(65) Prior Publication Data
US 2024/0023302 A1      Jan. 18, 2024

Related U.S. Application Data

(63) Continuation of application No. PCT/JP2022/013915, filed on Mar. 24, 2022.

(30) Foreign Application Priority Data

Mar. 29, 2021    (JP) ................. 2021-056125

(51) Int. Cl.
*H05K 9/00*        (2006.01)
*B32B 17/10*       (2006.01)
(Continued)

(52) U.S. Cl.
CPC ..... *H05K 9/0067* (2013.01); *B32B 17/10036* (2013.01); *B32B 17/10201* (2013.01);
(Continued)

(58) Field of Classification Search
CPC ............ H05K 9/0067; B32B 17/10036; B32B 17/10201; B32B 17/1055; B32B 2605/08;
(Continued)

(56) References Cited

U.S. PATENT DOCUMENTS 5,650,208 A * 7/1997 Chaussade ............ B32B 27/308
                                                  219/203
10,737,469 B2    8/2020 Droste et al.
(Continued)

FOREIGN PATENT DOCUMENTS

CN       210573898 U    5/2020
JP      2013-206979 A  10/2013
(Continued)

OTHER PUBLICATIONS

International Searching Authority, "International Search Report," issued in connection with International Patent Application No. PCT/JP2022/013915, dated May 31, 2022.
(Continued)

*Primary Examiner* — Sreeya Sreevatsa
(74) *Attorney, Agent, or Firm* — Foley & Lardner LLP

(57) ABSTRACT

A ground structure-equipped laminated glass for vehicles is provided, with a countermeasure against static electricity on an electrically driven functional layer. The ground structure-equipped laminated glass for vehicles comprises a first glass plate, an interlayer and a second glass plate laminated in this order, wherein the interlayer has an electrically driven functional layer, a power supply member electrically connected to the electrically driven functional layer, a first circuit having the power supply member and the functional layer connected in series, and a second circuit having the power supply member, a flexible ESD shield, and a ground member connected in series, wherein at least one of the power supply member, the flexible ESD shield, and the ground member comprises a dielectric, and the ground member is grounded.

13 Claims, 3 Drawing Sheets

(51) Int. Cl.
  *B60J 1/00* (2006.01)
  *B60J 1/02* (2006.01)
  *B60R 16/06* (2006.01)

(52) U.S. Cl.
  CPC ............ *B32B 17/1055* (2013.01); *B60J 1/001* (2013.01); *B60R 16/06* (2013.01); *B32B 2605/08* (2013.01); *B60J 1/02* (2013.01)

(58) Field of Classification Search
  CPC ........ B32B 17/10174; B32B 17/10357; B32B 17/10495; B32B 17/10504; B32B 17/10376; B32B 2250/03; B32B 2307/206; B32B 2307/21; B32B 2457/20; B32B 2605/00; B32B 17/10293; B60J 1/001; B60J 1/02; B60R 16/06; H01R 12/775
  USPC ......................................................... 361/216

See application file for complete search history.

(56) References Cited

U.S. PATENT DOCUMENTS

| | | | |
|---|---|---|---|
| 2006/0152334 A1* | 7/2006 | Maercklein | H05K 1/162 338/210 |
| 2009/0322202 A1* | 12/2009 | Auday | B32B 17/10761 313/484 |
| 2012/0154229 A1* | 6/2012 | Kagaya | H01Q 13/10 343/713 |
| 2015/0343744 A1* | 12/2015 | Ogawa | B32B 17/10467 219/201 |
| 2017/0131604 A1* | 5/2017 | Cao | G02F 1/136204 |
| 2020/0023718 A1* | 1/2020 | Funatsu | H01Q 21/28 |
| 2022/0338310 A1* | 10/2022 | Yano | H05B 3/86 |

FOREIGN PATENT DOCUMENTS

| | | |
|---|---|---|
| JP | 2018-513638 A | 5/2018 |
| WO | WO-2014/122704 A1 | 8/2014 |

OTHER PUBLICATIONS

International Searching Authority, "Written Opinion," issued in connection with International Patent Application No. PCT/JP2022/013915, dated May 31, 2022.

* cited by examiner

GROUND STRUCTURE-EQUIPPED LAMINATED GLASS FOR VEHICLES

This application is a continuation of PCT Application No. PCT/JP2022/013915, filed on Mar. 24, 2022, which is based upon and claims the benefit of priority from Japanese Patent Application No. 2021-056125 filed on Mar. 29, 2021. The contents of those applications are incorporated herein by reference in their entireties.

TECHNICAL FIELD

The present invention relates to a ground structure-equipped laminated glass for vehicles.

BACKGROUND ART

Heretofore, a laminated glass for vehicles, having a functional layer with various functions provided between one glass and the other glass, the functional layer being driven by power supply from an external power source to fulfil a desired function thereby to realize the function, has been known (for example, Patent Document 1).

For example, the following Patent Document 1 discloses a laminated glass having, between a first glass plate and a second glass plate, an organic EL panel layer, a light control device layer or an antifogging device layer bonded via an interlayer. To such a functional layer, an electric conductor formed in a flaky strip shape is connected to supply power from a power source.

PRIOR ART DOCUMENTS

Patent Documents

Patent Document 1: WO2014/122704

DISCLOSURE OF INVENTION

Technical Problem

By the way, if static electricity from a charged body including a human body is discharged via wiring, in a laminated glass in which an electrically driven functional layer such as a display is sealed, e.g. at the time of storage, shipping, mounting on a vehicle, or use, the sealed functional layer itself, or a semiconductor member in the functional layer, may be damaged by electrostatic discharge. Even when a human touches the glass surface of the laminated glass, the static electricity propagates the glass surface and reaches the wiring and may flow even into a semiconductor member.

As a countermeasure against static electricity on a semiconductor member in the functional layer, a static electricity protection device has been known, however, a static electricity protection device poorly follow deformation of the material at the time of lamination for a laminated glass and is thereby hardly mounted. In a usual laminated glass, the semiconductor member in the functional layer is electrically floating and thus, shielding/grounding as a countermeasure against static electricity is structurally difficult.

Under these circumstances, the object of the present invention is to provide a ground structure-equipped laminated glass for vehicles with a countermeasure against static electricity on an electrically driven functional layer.

Solution to Problem

According to an embodiment of the disclosure, a ground structure-equipped laminated glass for vehicles, comprises a first glass plate, an interlayer and a second glass plate laminated in this order,
the interlayer having:
an electrically driven functional layer,
a power supply member electrically connected to the functional layer,
a first circuit having the power supply member and the functional layer connected in series, and
a second circuit having the power supply member, a flexible ESD shield and a ground member connected in series;
the second circuit having a dielectric at least at one point in the second circuit; and
the ground member being grounded.

Advantageous Effects of Invention

According to an embodiment of the disclosure, a ground structure-equipped laminated glass for vehicles with a countermeasure against static electricity on an electrically driven functional layer, can be provided.

DESCRIPTION OF EMBODIMENTS

In this specification, "upward" and "downward" means upward and downward in a state where the ground structure-equipped laminated glass for vehicles is mounted on a vehicle. The "side edge" of the ground structure-equipped laminated glass for vehicles means a portion connecting the upper side and the lower side. And, the "cross section" means a cut surface of the ground structure-equipped laminated glass for vehicles in the thickness direction, or the side surface of the ground structure-equipped laminated glass for vehicles. The side surface does not exclusively mean a surface having the side edge. Further, in this specification, the "periphery" means an outermost side of a predetermined member, and the "peripheral portion" means a vicinity of the "periphery". In a case where a predetermined member has a hollow, the "periphery" may also be referred to as the "outer periphery" and distinguished from the "inner periphery" which is the outer periphery of the hollow.

In this specification, "the same shape" means the same shape as viewed by human eyes. Unless otherwise specified, "substantially the same" means the same as viewed by human eyes. Further, "to" used to show the range of the numerical values is used to include the upper and lower limit values.

The ground structure-equipped laminated glass for vehicles according to an embodiment of the present invention is applicable, for example, to windshield, rear glass, side glass, roof glass, quarter glass, etc.

First Embodiment

Now, the first embodiment of the present invention will be described with reference to FIGS. 1 to 4. In drawings, for visibility of constituents, the constituents have different scales of dimensions, and a curved shape is represented as a flat shape.

Figure 1:
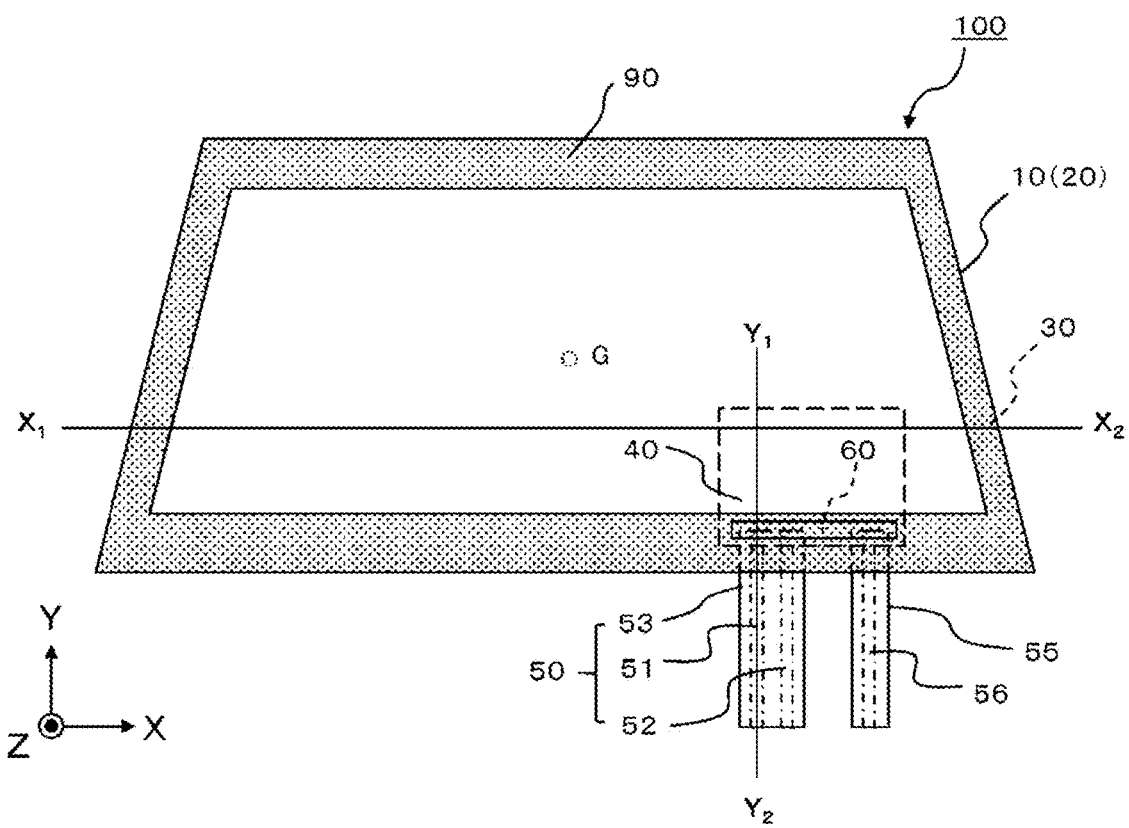
FIG. 1 is a plan view illustrating a ground structure-equipped laminated glass for vehicles according to a first embodiment.

FIG. 1 is a plan view illustrating a ground structure-equipped laminated glass for vehicles according to the present embodiment. The ground structure-equipped laminated glass for vehicles will be referred to simply as "a laminated glass". The laminated glass 100 has a first glass plate 10 and a second glass plate 20, having principal surfaces of the same shape, and an interlayer 30 disposed between them. And, the first glass plate 10, the interlayer 30 and the second glass plate 20 are laminated in this order. Further, the center axis (not shown) of the laminated glass 100 is a virtual line in the thickness direction, passing the center of gravity G of the laminated glass 100. The direction of the center axis of the laminated glass 100 agrees with the Z-axis direction in FIG. 1.

As shown in FIG. 1, the laminated glass 100 is substantially trapezoidal as viewed in a plan view, but is not limited thereto. Depending upon the portion of a vehicle to which the laminated glass 100 is mounted, the laminated glass 100 may, for example, be substantially triangular or substantially rectangular, as viewed in a plan view.

A view of the laminated glass 100 or the first glass plate 10 in a plan view means a view from perpendicularly above relative to a horizontal plane, on which the laminated glass 100 is placed so that the first glass plate 10 faces upward. Further, a view in a cross section means a view of a predetermined cross section of the laminated glass 100 from a perpendicular direction.

Further, at least part of the vertical cross section of the laminated glass 100 may have a substantially wedge shape the thickness of which gradually decreases. A laminated glass, which has a wedge-shaped vertical cross section such that its thickness at least partly increases from the bottom to the top, suitably functions as a head up display (HUD), and is particularly suitably used for windshield. In order that the laminated glass 100 has such a cross sectional shape, at least one of the first glass plate 10, the second glass plate 20 and the interlayer 30 should have a vertical cross section which is at least partly substantially wedge-shaped.

The laminated glass 100 according to the present embodiment has a functional layer 40 inside the interlayer 30. The periphery of the functional layer 40 is located on the inner side than the periphery of the first glass plate 10. Here, the "inner side" means the direction of the center axis passing the center of gravity G of the laminated glass 100 as seen from the periphery of a predetermined member (here, the first glass plate 10). On the other hand, the "outer side" means the direction of the periphery of a predetermined member (here, the first glass plate 10) as seen from the center axis passing the center of gravity G of the laminated glass 100.

To the functional layer 40, a power supply member 50 is electrically connected. That is, the power supply member 50 and the functional layer 40 are connected in series to form a first circuit. The edge (contact point) on the functional layer 40 side of the power supply member 50 may be electrically connected directly to the functional layer 40, or may be electrically connected via a transparent conductive film or a foil-shaped conductor called a bus bar. The connection method may be any optional known method.

The power supply member 50 is a flexible connecting member having at least two power supply cables which supply different electric potentials when the functional layer 40 is driven, covered with an insulating member 53. Specifically, the power supply member 50 has, inside the insulating member 53, a power supply cable 51 and a power supply cable 52, and the terminal of each of the power supply cables has a portion (contact point) connected to the functional layer 40 and is not covered with the insulating member 53. The other edge (non-contact point) of the power supply member 50, opposite from the functional layer 40, is also not covered with the insulating member 53, but may be covered as the case requires. The power supply cable 51 and the power supply cable 52 are connected at their edges (contact points), for example via soldering or an anisotropic conductive film (ACF), to the functional layer 40. The power supply cable 51 and the power supply cable 52 are disposed apart from each other in the insulating member 53 so that they are not short-circuited. The edge (non-contact point) of the power supply member 50 opposite from the functional layer 40 can be connected to an electronic control unit (ECU) of a vehicle.

In the laminated glass 100 shown in FIG. 1, an ESD shield 60 is disposed so as to overlap with at least a part of the power supply member 50. Specifically, the ESD shield 60 overlaps with a part of the edge (contact point) of a power supply cable 51 and a power supply cable 52 and with a part of the insulating member 53. They may be disposed so that the terminal in the positive Y axis direction of the ESD shield 60 agrees with the terminal in the positive Y axis direction of the power supply cable 51 and the power supply cable 52, or with the terminal in the positive Y axis direction of the insulating member 53. By such a disposition, the interlayer 30 tends to be brought into close contact with the ESD shield 60 and the power supply member 50, and the circuit (mainly the second circuit described later) is less likely to have drawbacks. Otherwise, the ESD shield 60 may not overlap with the terminal (contact point) of the power supply cable 51 and the power supply cable 52 but overlap in the negative Y axis direction side than the edge (contact point). The positive Y axis direction may be considered as a direction from the edge (non-contact point) of the power supply member 50 opposite from the functional layer 40 toward the edge (contact point) on the functional layer side.

The ESD shield 60 is a member for countermeasure against ESD (Electro-Static Discharge), and is a flexible conductive member disposed to prevent static electricity discharged to the laminated glass 100 from arriving at the functional layer 40. Even if static electricity flows to the power supply cable 51 or the power supply cable 52, the grounded ESD shield 60 can effectively run static electricity to the outside of the laminated glass 100.

The ESD shield 60 is connected electrically to the ground member 55. That is, the power supply member 50, the ESD shield 60 and the ground member 55, at least one of which is at least partly constituted by a dielectric, are connected in series to form a second circuit. In other words, the second circuit is a circuit which maintains electrical insulating property in functions of a conventional functional layer by the dielectric. The ground member 55 is a flexible connecting member, having a ground cable 56 covered with an insulating member. The outline of the ground cable 56 is represented by a long and short dash line in FIG. 1. The ground member 55 grounds the ESD shield 60.

The laminated glass 100 may have, as shown in FIG. 1, a strip light shielding portion 90 at its periphery. The light shielding portion 90 may be a single layer or may be multi-layered. The light shielding portion 90 can at least partly shield the periphery of the functional layer 40, the power supply member 50, the ground member 55, the ESD shield 60, etc.

Figure 2:
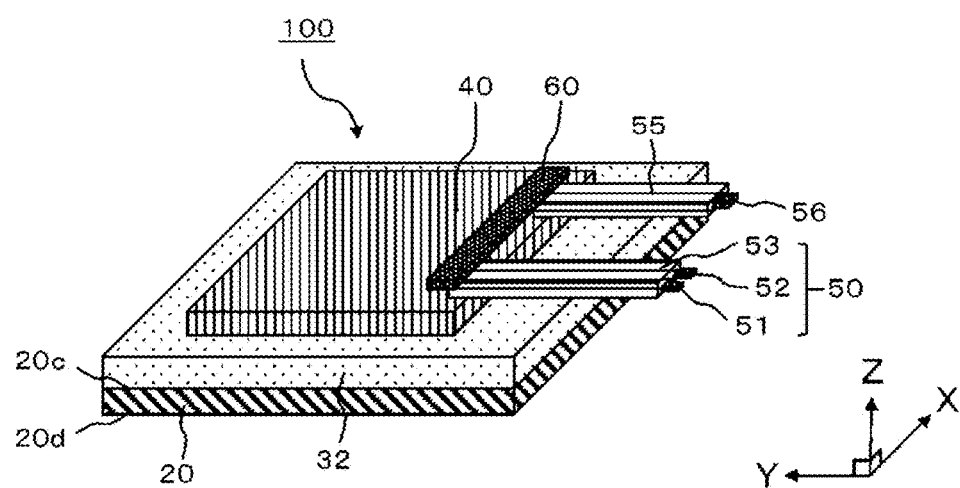
FIG. 2 is a perspective view illustrating a ground structure-equipped laminated glass for vehicles according to a first embodiment.

Now, the structure in the vicinity of the ESD shield 60 will be described with reference to FIG. 2. FIG. 2 is a perspective view illustrating the ground structure-equipped laminated glass for vehicles according to the present embodiment. In FIG. 2, in the laminated glass 100, the first glass plate 10, the light shielding portion 90 and part of the interlayer 30 are omitted. With respect to the interlayer 30, a first interlayer 31 and a third interlayer 33 described later are omitted, and only a second interlayer 32 is shown.

In FIG. 2, the power supply member 50, the power supply cable 51 and the power supply cable 52 are in a strip shape, but may be linear. Further, the ground member 55 and the ground cable 56 are in a strip shape, but may be linear.

The second circuit has a dielectric at least at one point. The dielectric may form, for example, the interlayer 30 or the insulating member 53. In other words, at least part of the dielectric may be constituted by the interlayer 30, may be constituted by the insulating member 53, or may be constituted by the interlayer 30 and the insulating member 53. In the present embodiment, the ESD shield 60 is not in direct contact with the power supply cable 51 and the power supply cable 52 of the power supply member 50. Accordingly, in the second circuit, the dielectric is disposed between the ESD shield 60, and the power supply cable 51 and the power supply cable 52. Static electricity has a high voltage of 2 kV or more, and flows from the power supply cable 51 or the power supply cable 52 into the ESD shield 60 while damaging the dielectric by electrostatic discharge. Thus, flow of static electricity into the functional layer 40 is suppressed.

Specifically, the ground member 55 has a ground cable 56 inside the insulating member, and the edge (contact point) on the ESD shield 60 side is not covered with the insulating member. In FIG. 2, the ground cable 56 is in contact with and is connected to the ESD shield 60 for example via soldering or an anisotropic conductive film (ACF) at the edge (contact point) in the positive Y axis direction.

The power supply member 50 and ground member 55 are disposed so that their extension directions are substantially in parallel with each other. However, part of the power supply member 50 and the ground member 55 may not be substantially in parallel. Further, in FIG. 1, the ground member 55 may be electrically connected to the ESD shield 60 via the vicinity of a side edge and/or the vicinity of an upper side inside the laminated glass 100.

The distance between the power supply member 50 and the ground member 55 (the distance in the X axis direction) is not particularly limited and may, for example, be 100 mm or less. The power supply member 50 and the ground member 55 may be adjacent to each other or overlapped with each other as viewed in a plan view. In such a case, the ground cable 56 may be disposed between the power supply cable 51 and the power supply cable 52. Further, the ground cable 56 may be united with the ESD shield 60. "United" means that they are continuous without a contact point.

The functional layer 40 may be disposed on an optional position of the XY plane in an optional size, however, in order to protect the functional layer 40 from physical impact, moisture, etc., the distance between the periphery of the first glass plate 10 and the periphery of the functional layer 40, in the XY plane direction, is preferably more than 0 mm, more preferably 5 mm or more, further preferably 10 mm or more. In a side from which the power supply member 50 is drawn outside the principal surface of the laminated glass 100, to secure a space in which the ESD shield is disposed, the distance from the periphery of the first glass plate 10 to the periphery of the functional layer 40 in the XY plane direction is preferably 20 mm or more.

Figure 3:
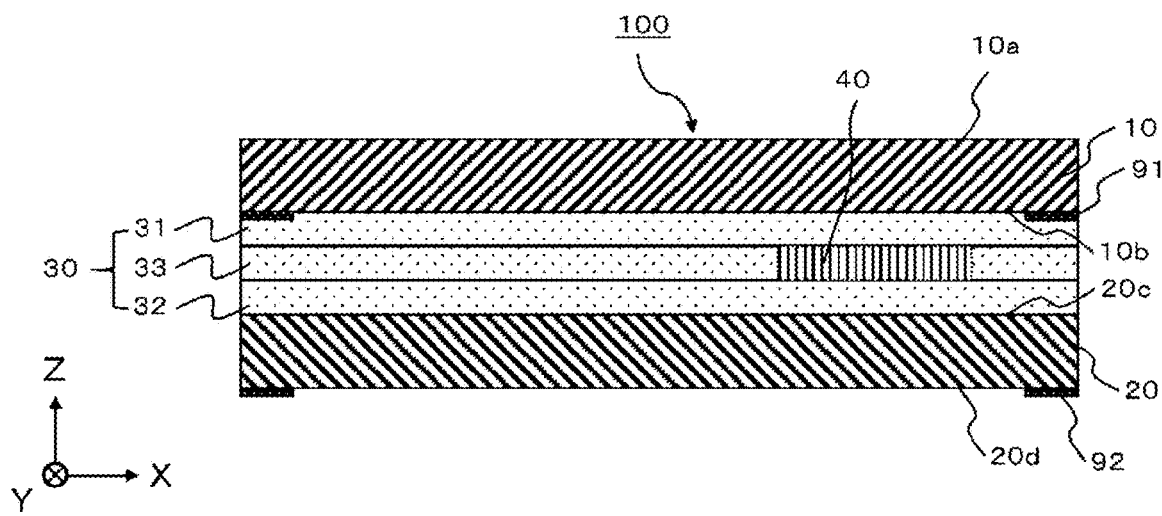
FIG. 3 is a cross sectional view illustrating a ground structure-equipped laminated glass for vehicles according to a first embodiment.

FIG. 3 is a cross sectional view illustrating the laminated glass 100 cut in the XZ plane at a $X_1$-$X_2$ line in FIG. 1, viewed from the negative Y axis direction. In FIG. 3, the laminated glass 100 has the first glass plate 10, the interlayer 30 and the second glass plate 20 laminated in this layer. The first glass plate 10 has a first principal surface 10a on the opposite side from the interlayer 30, and a second principal surface 10b on the interlayer 30 side. The second glass plate 20 has a third principal surface 20c on the interlayer 30 side, and a fourth principal surface 20d on the opposite side from the interlayer 30. The laminated glass 100 according to an embodiment has, as the light shielding portion 90, a light shielding portion 91 on the second principal surface 10b and a light shielding portion 92 on the fourth principal surface 20d. The light shielding portion 90 is not necessarily constituted by the light shielding portion on the principal surface of the glass plate, and may be constituted e.g. by a colored interlayer.

The interlayer 30 has a first interlayer 31 in contact with the first glass plate 10, a second interlayer 32 in contact with the second glass plate 20, and a third interlayer 33 sandwiched between the first interlayer 31 and the second interlayer 32. Here, the interlayer 30 may have an interlayer other than the first interlayer 31, the second interlayer 32 and the third interlayer 33. Further, the functional layer 40 is sandwiched between the first interlayer 31 and the second interlayer 32. And, the periphery of the functional layer 40 is in contact with the third interlayer 33. That is, in a plan view of the laminated glass 100, the inner peripheral shape of the third interlayer 33 is substantially the same as the peripheral shape of the functional layer 40. And, the functional layer 40 is placed in a hollow inside the outer periphery of third interlayer 33.

By disposing the third interlayer 33 along the periphery of the functional layer 40, at the peripheral portion of the functional layer 40, the interlayer 30, and the first glass plate 10 and the second glass plate 20, are likely to be in close contact with each other, and a gap is less likely to form at the peripheral portion. However, in a case where the ESD shield 60 is disposed close to the functional layer 40, the inner peripheral shape of the third interlayer 33 may have a size to such an extent that the functional layer 40 and the ESD shield 60 are held.

The third interlayer 33 is not essential and may be used as the case requires. Use of the third interlayer 33 is suitable when the thickness of the functional layer 40 is mm or more, and is more suitable when it is 0.18 mm or more. In other words, when the thickness of the functional layer 40 is less than 0.15 mm, the interlayer 30 does not necessarily have the third interlayer 33. In a case where the interlayer 30 does not have the third interlayer 33, the periphery of the functional layer 40 is in contact with at least one of the first interlayer 31 and the second interlayer 32.

Figure 4:
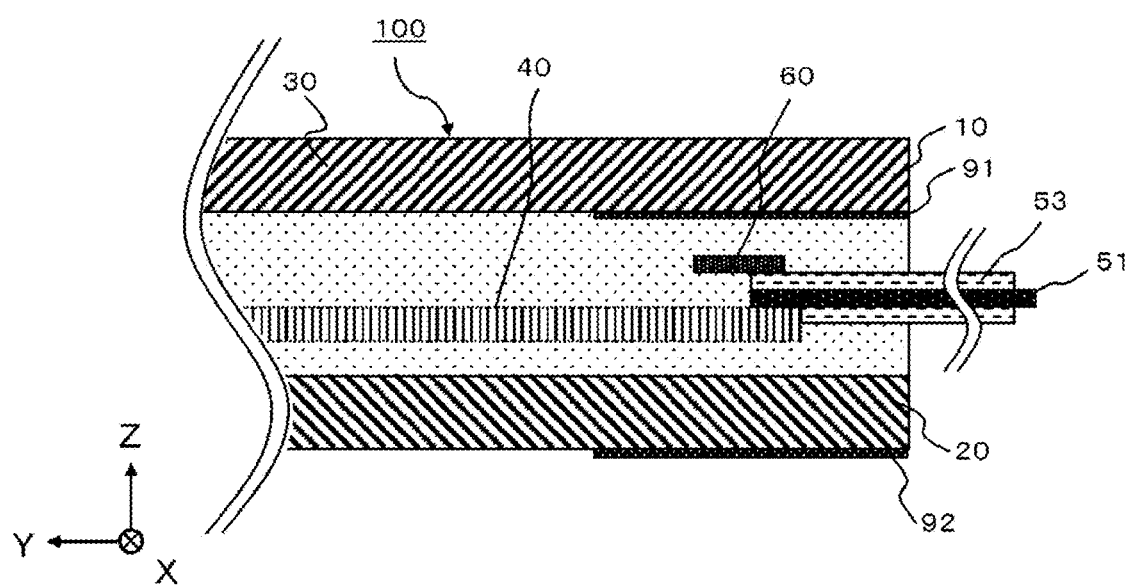
FIG. 4 is another cross sectional view illustrating a ground structure-equipped laminated glass for vehicles according to a first embodiment.

FIG. 4 is a cross sectional view illustrating the laminated glass 100 cut in the YZ plane at a $Y_1$-$Y_2$ line in FIG. 1, viewed from the negative X axis direction. Now, the power supply cable 51 and the power supply cable 52 will be described with reference to the power supply cable 51, however, the description applies also to the power supply cable 52. In FIG. 4, the edge (contact point) of the power supply cable 51 is in contact with the functional layer 40 and is not in contact with the ESD shield 60. The drive voltage of the functional layer 40 is sufficiently lower than 2 kV, and thus a drive current of the functional layer 40 flows from the power supply cable 51 to the functional layer 40 without breaking down the dielectric. On the other hand, since static electricity has a high voltage, static electricity if generated in the power supply cable 51 breaks down the dielectric, and the current flows to the grounded ESD shield 60.

The minimum dielectric withstand voltage of the dielectric (the interlayer 30 or the insulating member 53) is preferably 0.5 kV/mm or more and 500 kV/mm or less. When it is 0.5 kV/mm or more, dielectric breakdown of the functional layer 40 by the drive current is less likely to occur. It is more preferably 1 kV/mm or more, further preferably 5 kV/mm or more, particularly preferably 10 kV/mm or more. When it is 500 kV/mm or less, dielectric breakdown will occur even without a treatment to make the dielectric extremely thin, and it is more preferably 400 kV/mm or less, further preferably 200 kV/mm or less, particularly preferably 100 kV/mm or less. Further, it is preferred that the minimum dielectric withstand voltage of the interlayer 30 is lower than the minimum dielectric withstand voltage of the insulating member 53, whereby even when an electronic member other than the functional layer 40 is disposed at a position different from the second circuit in the vicinity of the power supply member 50, the electronic member can be protected from ESD.

The minimum dielectric withstand voltage may be measured as the "electric strength (kV/mm)" in accordance with JIS C2110-3 "Solid electric insulating materials-Test methods for electric strength—Part 3: Tests using impulse voltage".

Further, the product of the distance (mm) between the first edge and the second edge of the dielectric in the second circuit, and the minimum dielectric withstand voltage (kV/mm) of the dielectric between the ESD shield 60 and the power supply cable 51, is preferably 2 kV or less, more preferably 1 kV or less. If the value is 2 kV or less, dielectric breakdown is likely to occur even by static electricity with relatively low voltage, and the functional layer 40 is likely to be protected. The minimum of the value is not particularly limited so long as it is higher than the drive voltage of the functional layer 40, and may, for example, be 0.2 kV, may be 0.4 kV, may be 0.6 kV, or may be 0.8 kV.

The distance (mm) between the first edge and the second edge of the dielectric in the second circuit can hardly be specified strictly and thus may be replaced by a physical distance between members connected to the first edge and the second edge of the dielectric. For example, in the present embodiment, as the distance (mm) between the ESD shield 60 and the power supply cable 51, the distance (mm) between the first edge and the second edge of the dielectric in the second circuit may be employed. In such a case, the first edge and the second edge of the dielectric are a portion in contact with the EDS shield 60 and a portion in contact with the power supply cable 51, respectively, among the edges of the dielectric.

Further, the ESD shield 60 has an impedance (input impedance) lower than the functional layer 40, and thus static electricity can be run to the ESD shield 60 side by priority to the functional layer 40. Specifically, at a frequency of 1 MHz or more (for example 8 MHz), the impedance of the ESD shield 60 should be lower than the impedance of the functional layer 40.

Second Embodiment

Now, the ground structure-equipped laminated glass for vehicles 200 (hereinafter referred to simply as "laminated glass 200") according to a second embodiment of the present invention will be described with reference to FIG. 5. The laminated glass 200 according to the second embodiment will be described particularly with respect to points different from the laminated glass 100 according to the first embodiment, and with respect to the other points, description for the laminated glass 100 is employed. The laminated glass 200 is characterized in that in the second circuit, a dielectric is disposed between the ESD shield 61 and the ground member 55.

Figure 5:
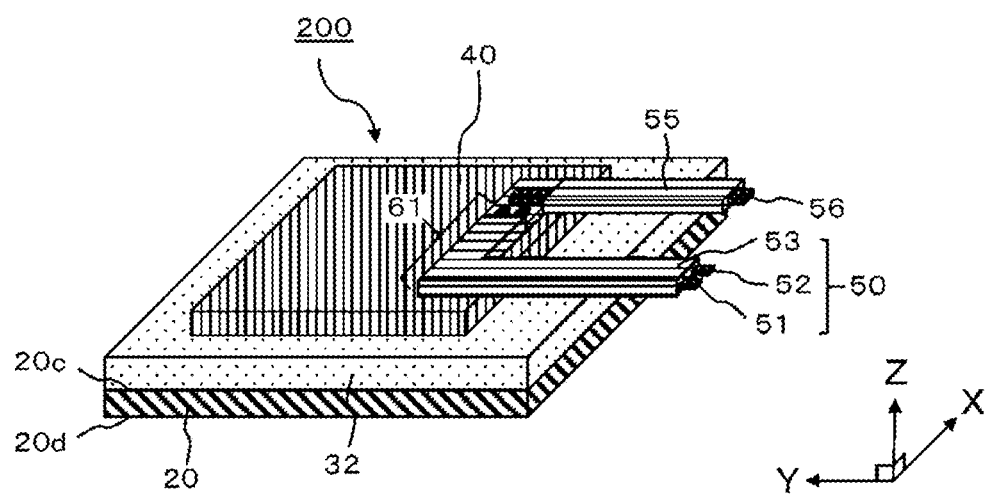
FIG. 5 is a perspective view illustrating a ground structure-equipped laminated glass for vehicles according to a second embodiment.

FIG. 5 is a perspective view illustrating the laminated glass 200 according to the present embodiment. In FIG. 5, the first glass plate 10, the light shielding portion 90 and part of the interlayer 30 of the laminated glass 200 are omitted. Of the interlayer 30, the first interlayer 31 and the third interlayer 33 described later are omitted, and only the second interlayer 32 is shown. For visibility of constituents, the constituents have different scales of dimensions, and a curved shape is represented as a flat shape.

In the laminated glass 200, the ESD shield 61 is united with the power supply member 50 and is apart from the ground member 55. That is, the ESD shield 61 is continuous with the power supply cable 51 and the power supply cable 52 of the power supply member 50, and is separated from the ground member 55 by the interlayer 30 as the dielectric. In other words, the power supply member 50 is bent to the positive X axis direction at a contact point with the functional layer 40, and a portion extending to the positive X axis direction from the contact point with the functional layer 40 functions as the ESD shield 61. A portion of the power supply member 50 extending to the Y axis direction to a point where it is connected to the functional layer 40 constitutes a first circuit.

In FIG. 5, the ESD shield 61 is covered with the insulating member 53 of the power supply member 50, however, it is not necessarily covered. Further, the dielectric to separate the ESD shield 61 and the ground member 55 may, for example, be the insulating member 53 or an insulating member of the ground member 55. Further, the ground member 55 may be bent to the negative X axis direction at the edge in the positive Y axis direction and extend to the vicinity of the ESD shield 61. In such a case, the width (length in the X axis direction) of the ESD shield 61 may be about the same as or smaller than the width of the power supply member 50.

In the present embodiment, the distance (mm) between the ESD shield 61 and the ground cable 56 may be taken as the distance (mm) between the first edge and the second edge of the dielectric in the second circuit.

The second circuit has been described above with reference to the embodiment in which the dielectric is disposed at one point between the ESD shield 60 and the power supply member 50, and the embodiment in which the dielectric is disposed at one point between the ESD shield 61 and the ground member 55. However, the present invention is not limited to such embodiments, and the dielectric may be disposed at two or more points in the second circuit. For example, the dielectric may be disposed between the ESD shield 61 and the power supply member 50, and between the ESD shield 61 and the ground member 55. Further, for example, the ESD shield 61 may be constituted by two or more portions, and the dielectric may be disposed between the portions.

Then, constituents of the laminated glasses 100 and 200 will be described in further detail. The constituents are represented by the reference symbols used in FIGS. 1 to 5. The reference symbols for the laminated glasses 100 and 200 are omitted.

<Glass Plate>

The first glass plate 10 and the second glass plate 20 may be in a flat plate shape, at least one of them may be curved, or both may be curved. Each of the first glass plate 10 and the second glass plate 20 may be single curved such that the curved direction is single (cylindrical) or may be double curved in two orthogonal directions.

The radius of curvature of the first glass plate 10 is preferably substantially the same as the radius of curvature of the second glass plate 20 (including a case where both are in a flat plate shape) or larger than the radius of curvature of the second glass plate 20. That is, the ratio of the minimum radius of curvature ($r_1$) of the first glass plate 10 to the minimum radius of curvature ($r_2$) of the second glass plate 20 is preferably $1 \leq r_1/r_2$.

$r_1$ and $r_2$ are preferably 500 mm or more with a view to reducing wrinkles of the interlayer 30 and perspective distortion, more preferably 700 mm or more. In a case where the laminated glass has a curved shape, the maximum radius of curvature ($R_1$) of the first glass plate 10 and the maximum radius of curvature ($R_2$) of the second glass plate 20 are preferably 100,000 mm or less, more preferably 50,000 mm or less, further preferably 30,000 mm or less, particularly preferably 20,000 mm or less.

In a case where the laminated glass of which $r_1$ and $r_2$ are substantially the same is attached to a vehicle, either of the first glass plate 10 and the second glass plate 20 may be disposed to the vehicle interior side. On the other hand, in a case where the laminated glass of which $r_1$ and $r_2$ are different is attached to a vehicle, in order to secure the strength as a laminated glass, the glass plate having a larger one of $r_1$ and $r_2$ is preferably disposed on the vehicle exterior side. For example, when $r_1 > r_2$, the first glass plate 10 may be disposed on the vehicle exterior side, and the second glass plate 20 may be disposed on the vehicle interior side.

As the first glass plate 10 and the second glass plate 20, known inorganic glass or organic glass used for a vehicle window glass may be used. The composition of the first glass plate 10 and the composition of the second glass plate 20 may be the same or different. The inorganic glass may, for example, be conventional soda lime glass, aluminosilicate glass, borosilicate glass, alkali free glass or quartz glass.

Such a glass plate may be produced by an optional known method such as float process, fusion method, roll out method or down draw method. For bending inorganic glass, gravity forming or pressing may, for example, be employed, and the glass plate is bent at high temperature. Further, the inorganic glass may be non-tempered glass formed by forming molten glass into a plate, followed by annealing, or may be subjected to tempering treatment such as physical tempering (for example air-tempering) or chemical tempering as the case requires.

As organic glass, a polycarbonate resin, an acrylic resin, a polystyrene resin, an aromatic polyester resin, a polyester resin, a polyarylate resin, a polycondensate of halogenated bisphenol A and ethylene glycol, an acrylic urethane resin or a halogenated aryl group-containing acrylic resin may, for example, be mentioned. As the organic glass, a polycarbonate resin is preferred, with which a sheet being light in weigh and having flexibility can be obtained. The above resins may be used in combination of two or more.

The first glass plate 10 and the second glass plate 20 are preferably formed of soda lime glass or alkali free glass. And, the first glass plate 10 and the second glass plate 20 are preferably float glass.

Both inorganic glass and organic glass are usually colorless, but are not limited so long as they are transparent and may be colored. In a case where the glass is colored, it may be so-called privacy glass which has a dark color such as gray. Privacy glass has effects to make it difficult to see the vehicle interior from outside the vehicle, to reduce transmission of sunlight from outside the vehicle into inside and to improve aesthetics from inside and outside the vehicle. For glasses other than the windshield, particularly for the roof, the rear side glass, the rear glass, the quarter glass, etc., privacy glass is suitably used. Further, inorganic glass and organic glass may contain an infrared shielding material, an ultraviolet shielding material or the like.

The thicknesses of the first glass plate 10 and the second glass plate 20 are properly selected depending upon the type, the area, etc. of the vehicle on which the laminated glass 100 is mounted, and are usually from 0.1 mm to 10 mm respectively. In order that the density (the surface density) per unit area determined by the mass and the surface area of the laminated glass is within a preferred range, the thicknesses of the first glass plate 10 and the second glass plate 20 are preferably from 0.3 mm to 2.6 mm. The thicknesses of the two glass plates 10 and 20 may be the same or different from each other.

In a case where the two glass plates 10 and 20 have different thicknesses, the laminated glass is attached to a vehicle preferably so that the glass plate located on the vehicle exterior side is thicker than the glass plate located on the vehicle interior side, in view of resistance to flying stone from outside. In such a case, in the laminated glass, in view of flying stone resistance, the difference between the thickness of the first glass plate 10 and the thickness of the second glass plate 20 is preferably from 0.3 mm to 1.5 mm, more preferably from 0.3 mm to 1.3 mm.

When the laminated glass is attached to a vehicle, the thickness of the glass plate located on the vehicle exterior side is preferably 1.1 mm or more, more preferably 1.3 mm or more, further preferably 1.6 mm or more, particularly preferably 1.8 mm or more. Further, the thickness of the glass plate on the vehicle exterior side is preferably 2.6 mm or less, more preferably 2.1 mm or less.

On the other hand, when the laminated glass is attached to a vehicle, the thickness of the glass plate located on the vehicle interior side is preferably 0.3 mm or more, more preferably 0.5 mm or more, further preferably 0.7 mm or more, particularly preferably 1.1 mm or more, most preferably 1.6 mm or more. Further, the thickness of the glass plate located on the vehicle interior side is preferably 2.6 mm or less, more preferably 2.1 mm or less.

On at least one of surfaces exposed to the air (the first principal surface 10a and the fourth principal surface 20d) of the two glass plates 10 and 20, a coating film to impart water repellent function, hydrophilic function, antifogging function or the like may be laminated. Further, on the surfaces facing each other (the second principal surface and the third principal surface 20c) of the two glass plates 10 and 20, a coating film usually containing a metal layer, such as a low emissivity coating, an infrared shielding coating or a conductive coating may be laminated.

<Interlayer>

As the interlayer 30, one commonly used for laminated glass may be used. The interlayer 30 may be formed by solidifying, for example, one of a thermoplastic resin, a thermosetting resin or a photocurable composition contained as the main component. "Solidifying" here includes curing.

The interlayer 30 has various functions, such as bonding of members, relaxation of impact, sound insulating property described later, etc. In view of adhesion, at least two of the first interlayer 31, the second interlayer 32 and the third interlayer 33 are preferably formed of the same material as the main component, and preferably all the interlayers constituting the interlayer 30 have the same main component.

The interlayer 30 has sound insulating property by being constituted by layers differing in the glass transition point. As the three-layered laminated structure having sound insulating property, the interlayer 30 may have, for example, such a constitution as having a core layer having a glass transition point of less than 15° C. as a layer in the middle in the thickness direction, and skin layers having a glass transition point of 15° C. or higher as two layers sandwiching the core layer (the layer in the middle). As a five-layered laminated structure having sound insulating property, the interlayer 30 may have, for example, a constitution having a skin layer, a core layer, a skin layer, a core layer and a skin layer laminated in this order. Otherwise, at least one of the first interlayer 31 and the second interlayer 32 may have a three-layered laminated structure having sound insulating property. In such cases, the laminated glass according to the present embodiment has an sound insulating effect also.

The thermoplastic resin may, for example, be a polyvinyl acetal resin such as a polyvinyl butyral resin (PVB), a polyvinyl chloride resin (PVC), a saturated polyester resin, a polyurethane resin, an ethylene-vinyl acetate copolymer resin (EVA), an ethylene-ethyl acrylate copolymer resin or a cycloolefin polymer (COP). The thermoplastic resin used for the interlayer 30 is preferably PVB, EVA, a polyurethane resin or the like. Such thermoplastic resins may be used alone or in combination of two or more. The thermosetting resin is typically a silicone resin or an acrylic resin.

The photocurable composition typically contains a curable compound (A) having a curable group and a photopolymerization initiator (B). The photocurable composition may contain a non-curable component other than the photopolymerization initiator (B) as the case requires. The non-curable component may be a non-curable polymer (C), a chain transfer agent (D) or other additive.

The curable compound (A) may be e.g. an acrylic, silicone, urethane acrylate or epoxy compound. Among them, in order that the storage elastic modulus G' is easily adjusted to from $5 \times 10^2$ Pa to $1 \times 10^7$ Pa, the curable compound (A) is preferably a silicone or urethane acrylate compound. Further, in order that the gel fraction is easily adjusted to from 1% to 50%, the curable compound (A) is more preferably a urethane acrylate compound. By using the photocurable resin for the interlayer 30, heating is not necessary in the contact-bonding step and thus the laminated glass will be free from breakage or warpage by heating.

The interlayer 30 may contain one or more of additives such as an infrared absorber, an ultraviolet absorber, a coloring agent, a fluorescent agent, an adhesion-adjusting agent, a coupling agent, a surfactant, an antioxidant, a thermal stabilizer, a photo stabilizer, a dehydrating agent, an antifoaming agent, an antistatic agent and a flame retardant. A colored layer by a coloring agent can be utilized as a so-called shade band layer, that reduces the glare of the sun for passengers in a vehicle. The shade band layer may be provided, for example when the laminated glass is attached to a vehicle, in a strip shape along the upper side of the laminated glass.

The total thickness of the interlayer 30 is, with a view to securing handling efficiency, preferably from 0.3 mm to 3.15 mm. The thickness of each of the first interlayer 31, the second interlayer 32 and the third interlayer 33 is, with a view to securing penetration resistance, preferably 0.15 mm or more, more preferably 0.3 mm or more. Further, the thickness of each of the first interlayer 31, the second interlayer 32 and the third interlayer 33 is, in view of the weight limit of the laminated glass, preferably 3 mm or less, more preferably 1.2 mm or less, particularly preferably 0.8 mm or less. The thicknesses of the respective interlayers may be the same or different.

<Functional Layer>

The functional layer 40 is a layer electrically driven by power supply by the power supply member from a power source. The electrically driven functional layer 40 may be a light control layer, a light-emitting layer, a heating layer or the like. The functional layer 40 should be such that an electrically driven portion as a whole constitutes a plane. On the other hand, for example, an infrared shielding coating film or a resin film which emits light by ultraviolet light, disposed between the first glass plate 10 and the second glass plate 20, which is not electrically driven by itself, is not included in the functional layer, although it as a whole constitutes a plane.

Two or more functional layers 40 may be disposed. The two or more functional layers may be layers having the same function or may be layers having different functions. In a case where two or more functional layers 40 are disposed, each of the ESD shield 60 and the ground member 55 may be disposed singly, or two or more each may be disposed.

The functional layer 40 may be driven in series or may be driven by alternating current, however, the drive voltage is less than 2 kV. Accordingly, the current for drive flowing in the first circuit does not flow into the second circuit having a dielectric in normal operation. The drive voltage of the functional layer 40 is usually 500 V or less, and is 200 V or less or 100 V or less in many cases, and in normal operation of the functional layer 40, the electric current does not flow into the second circuit. Further, the drive voltage of the functional layer 40 may be for example 1 V or more.

The light control layer should have a function to change the visible light transmittance by electric drive and may be one which changes the color. The light control layer may, for example, be an electro chromic (EC) film, a liquid crystal (LC) film, a suspended particle device (SPD) film, or an electro kinetic (EK) film. The drive voltage of the light control layer is about 50 V to 200 V. The light control layer may also be utilized as a shade band.

The light-emitting layer should contain a material which emits light by electric drive, and may, for example, be a cold cathode fluorescent lamp (CCFL), a light emitting diode (LED), an organic light emitting diode (OLED) or a laser, or a display using them. Further, the light-emitting layer may be utilized as a display for direction indication or for attention attraction. The drive voltage of the light-emitting layer is about 3 V to 20 V.

The heating layer should contain one which generates heat by electric drive, and may contain at least one of a metal, a metal oxide and a conductive polymer. The heating layer may have an optional shape, such as a thin film shape or a thin line shape. Further, the heating layer may, specifically, be a heating film for anti-fogging or a heating wire for melting ice. Direct current is employed for the heating layer in many cases, and the drive voltage of the heating layer is about 5 V to 30 V.

<Ground Member and Ground Cable>

The insulating member of the ground member 55 contains a thermosetting resin or a thermoplastic resin. As the insulating member, a resin such as a polyester resin such as polyethylene terephthalate (PET), polyethylene naphthalate (PEN) or polybutylene terephthalate (PBT), a polyamide resin such as nylon 6, nylon 66 or nylon 610, a polyimide resin such as polyimide, polyamideimide or polyetherimide, a fluorinated resin, a polyethersulfone, a polyether ketone, a polyether sulfide, a polyarylate, a polyester ether, a wholly aromatic polyamide, a polyaramid, a polypropylene (PP), a polycarbonate (PC) or a liquid polymer may be used.

As the insulating member, among such resins, a polyimide resin such as a polyimide, which can withstand high temperature and high pressure conditions at the time of production of the laminated glass, can suitably be used. However, the resin used as the insulating member is not particularly limited so long as it is a material having insulating property, flexibility and heat resistance.

The shape of the ground member 55 is not particularly limited and may, for example be strip-shape or cylindrical. When the ground member 55 has a strip shape, both flexibility and bonding property are likely to be satisfied. The thickness or the diameter (hereinafter generally referred to simply as "thickness") of the ground member 55 is, for example, 30 μm or more, preferably 50 μm or more. Further, the thickness of the ground member 55 is, so as to prevent gaps around the ground member 55, preferably 600 μm or less, more preferably 400 μm or less, further preferably 300 μm or less, particularly preferably 100 μm or less.

The material constituting the ground cable 56 may, for example, be a metal such as gold, silver or copper, and among them, copper is preferred. The shape of the ground cable 56 is not particularly limited and may be a strip-shape or cylindrical in conformity with the shape of the ground member 55. The thickness of the ground cable 56 depends on the type of the functional layer 40 and is for example 10 μm or more. The thickness of the ground cable 56 is preferably 15 μm or more, more preferably 30 μm or more, so as to be in conformity with the functional layer 40 used for the laminated glass, and in view of handling efficiency. Further, the thickness of the ground cable 56 is preferably 150 μm or less, whereby the ground member 55 will not be excessively thick, and is more preferably 100 μm or less, further preferably 50 μm or less.

<Power Supply Member and Power Supply Cable>

As the material constituting the insulating member 53 of the power supply member 50, the resin which can be used as the insulating member of the ground member 55 may be used. The insulating member 53 and the insulating member of the ground member 55 may be the same or different.

Further, the materials constituting the power supply cable 51 and the power supply cable 52 may be the same as or different from the material constituting the ground cable 56. Further, the material constituting the power supply cable 51 and the material constituting the power supply cable 52 may be the same or different.

<ESD Shield>

The ESD shield 60 (61) is connected to a portion having a sufficiently low impedance, such as a body of a vehicle, via the ground member 55. The ESD shield 60 (61) may be connected to a signal ground of ECU, as a portion having a low impedance. However, in a case where the signal ground of ECU does not have the same potential as the vehicle body, the signal ground of ECU has a high impedance as compared with the vehicle body, and thus the ESD shield is preferably grounded to the vehicle body. The material constituting the ESD shield 60 (61) may, for example, be a metal such as gold, silver, copper or aluminum, and among them, copper is preferred. The metal may be oxidized by a component contained in the interlayer 30, such as a plasticizer, and its conductivity may be decreased. Thus, the ESD shield 60 (61) is preferably covered with a coating film so that the metal is not in direct contact with the interlayer 30. Further, to suppress oxidation by the component in the interlayer 30, the ESD shield 60 (61) may be constituted by a carbon material, or may be constituted by a composite material of a metal and carbon.

The ESD shield 60 (61) has to have an impedance (input impedance) lower than the functional layer 40. That is, the ratio of the impedance of the ESD shield 60 (61) to the impedance of the functional layer 40 for example at 25° C. at 8 MHz, has to be less than 1. Further, in order to run static electricity effectively to the ESD shield 60 (61), the ratio is preferably 0.5 or less, more preferably 0.2 or less, further preferably 0.1 or less, further more preferably 0.05 or less, particularly preferably 0.03 or less. The lower limit of the ratio is not particularly limited and may, for example, be 0.001.

In order that the ratio of impedance is within the above range, the impedance of the ESD shield 60 (61) at 25° C. at 8 MHz is preferably 100Ω or less, although it depends on the capacitance of the dielectric, etc. The lower limit of the impedance of the ESD shield 60 (61) is not particularly limited and is, for example, 4μΩ. Further, the dielectric constant of the dielectric disposed in the second circuit, at 25° C., may, for example, be from 2.0 to 8.0, and is preferably from 2.5 to 5.0, more preferably from 3.0 to 4.0. In a case where the dielectric is constituted by two or more materials, the dielectric constants of the respective materials are preferably within a range of from 2.0 to 8.0.

The cross sectional area of the ESD shield 60 (61) is preferably 0.003 mm 2 or more, so that static electricity can be effectively run to the ESD shield. The upper limit of the cross sectional area of the ESD shield 60 (61) is not particularly limited.

<Light Shielding Portion>

In a case where the laminated glass has the light shielding portion 90, the laminated glass has an opening which overlaps with the first glass plate 10 and which has no light shielding portion 90, in a plan view of the first glass plate 10, to secure the field of view of the driver. The width of the light shielding portion 90 is not particularly limited, however, in order to secure the area of the opening, it is preferably 50 mm or less, more preferably 30 mm or less, particularly preferably 20 mm or less, from the periphery of the first glass plate 10. The width of the light shielding portion 90 is preferably 5 mm or more from the periphery of the laminated glass, in order to effectively shield the contact points of the respective members.

As a material constituting the light shielding portion 90, an organic ink, an inorganic ceramic or a colored interlayer may, for example be mentioned. The light shielding portion 90 may be formed, for example, by applying an organic ink or an inorganic ceramic on a glass surface e.g. by screen printing, followed by drying. The color of the light shielding portion 90 is optional so long as the visible light can be blocked to such an extent that at least a portion to be shielded can be shielded, and is preferably a deep color such as black, brown, gray or navy blue, more preferably black.

The present invention has been described in detail with reference to the preferred embodiments, however, it is obvious for the person skilled in the art that the present invention is not limited to the specific embodiments and various changes and modifications are possible without departing from the intension and the scope of the present invention.

REFERENCE SYMBOLS 100, 200: laminated glass
10: first glass plate
10a: first principal surface
10b: second principal surface
20: second glass plate
20c: third principal surface
20d: fourth principal surface
30: interlayer
31: first interlayer
32: second interlayer
33: third interlayer
40: functional layer
50: power supply member
51, 52: power supply cable
53: insulating member
55: ground member
56: ground cable
61: ESD shield
90, 91, 92: light shielding portion
G: center of gravity

What is claimed is:

1. A ground structure-equipped laminated glass for vehicles, comprising a first glass plate, an interlayer and a second glass plate laminated in this order,
wherein the interlayer has an electrically driven functional layer,
a power supply member electrically connected to the electrically driven functional layer,
a first circuit having the power supply member and the electrically driven functional layer connected in series, and
a second circuit having the power supply member, a flexible ESD shield and a ground member connected in series, wherein at least one of the power supply member, the flexible ESD shield, and the ground member comprises a dielectric;
the ground member is grounded; and
wherein the power supply member has a first power supply cable and a second power supply cable, and the first power supply cable and the second power supply cable, and the ESD shield, partially overlap with each other in a plan view of the first glass plate.

2. The ground structure-equipped laminated glass for vehicles according to claim 1, wherein the dielectric is disposed between the power supply member and the ESD shield.

3. The ground structure-equipped laminated glass for vehicles according to claim 1, wherein the dielectric is disposed between the ESD shield and the ground member.

4. The ground structure-equipped laminated glass for vehicles according to claim 1, wherein at least part of the dielectric forms the interlayer.

5. The ground structure-equipped laminated glass for vehicles according to claim 1, wherein at least one of the power supply member, the ESD shield and the ground member has an insulating member, and at least part of the dielectric forms the insulating member.

6. The ground structure-equipped laminated glass for vehicles according to claim 1, wherein a minimum dielectric withstand voltage of the dielectric is 0.5 kV/mm or more and 500 kV/mm or less.

7. The ground structure-equipped laminated glass for vehicles according to claim 1, wherein a product of the distance (mm) between a first edge and a second edge of the dielectric in the second circuit, and the minimum dielectric withstand voltage (kV/mm) of the dielectric, is 2 kV or less.

8. The ground structure-equipped laminated glass for vehicles according to claim 1, wherein a dielectric constant of the dielectric is from 2.0 to 8.0.

9. The ground structure-equipped laminated glass for vehicles according to claim 1, wherein the ESD shield has a lower impedance than the electrically driven functional layer.

10. The ground structure-equipped laminated glass for vehicles according to claim 9, wherein the ratio of the impedance of the ESD shield to the impedance of the electrically driven functional layer is 0.5 or less.

11. The ground structure-equipped laminated glass for vehicles according to claim 1, wherein the first glass plate has a light shielding portion at its periphery as viewed in a plan view, and the ESD shield overlaps with the light shielding portion.

12. A ground structure-equipped laminated glass for vehicles, comprising a first glass plate, an interlayer and a second glass plate laminated in this order,
wherein the interlayer has an electrically driven functional layer,
a power supply member electrically connected to the electrically driven functional layer,
a first circuit having the power supply member and the electrically driven functional layer connected in series, and
a second circuit having the power supply member, a flexible ESD shield and a ground member connected in series, wherein at least one of the power supply member, the flexible ESD shield, and the ground member comprises a dielectric;
the ground member is grounded; and
wherein a minimum dielectric withstand voltage of the dielectric is 0.5 kV/mm or more and 500 kV/mm or less.

13. A ground structure-equipped laminated glass for vehicles, comprising a first glass plate, an interlayer and a second glass plate laminated in this order,
wherein the interlayer has an electrically driven functional layer,
a power supply member electrically connected to the electrically driven functional layer,
a first circuit having the power supply member and the electrically driven functional layer connected in series, and
a second circuit having the power supply member, a flexible ESD shield and a ground member connected in series, wherein at least one of the power supply member, the flexible ESD shield, and the ground member comprises a dielectric;
the ground member is grounded; and
wherein a product of the distance (mm) between a first edge and a second edge of the dielectric in the second circuit, and the minimum dielectric withstand voltage (kV/mm) of the dielectric, is 2 kV or less.

* * * * *